(12) United States Patent
Goossen

(10) Patent No.: US 8,089,225 B2
(45) Date of Patent: Jan. 3, 2012

(54) SYSTEMS AND METHODS FOR INERTIALLY CONTROLLING A HOVERING UNMANNED AERIAL VEHICLES

(75) Inventor: Emray R. Goossen, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 683 days.

(21) Appl. No.: 12/260,799

(22) Filed: Oct. 29, 2008

(65) Prior Publication Data
US 2011/0301783 A1    Dec. 8, 2011

(51) Int. Cl.
G05D 1/02 (2006.01)
H04Q 9/00 (2006.01)

(52) U.S. Cl. ............... 318/16; 318/587; 318/568.13; 345/156; 345/163

(58) Field of Classification Search ............ 318/16, 318/587, 568.13; 345/156, 158, 163, 166; 463/38
See application file for complete search history.

(56) References Cited

U.S. PATENT DOCUMENTS

| | | | |
|---|---|---|---|
| 4,914,976 A | 4/1990 | Wyllie | |
| 5,059,958 A | 10/1991 | Jacobs et al. | |
| 5,128,671 A * | 7/1992 | Thomas, Jr. | 341/20 |
| 5,178,307 A | 1/1993 | Wright et al. | |
| 5,506,605 A | 4/1996 | Paley | |
| 5,528,265 A | 6/1996 | Harrison | |
| 6,694,228 B2 * | 2/2004 | Rios | 701/2 |
| 7,127,333 B2 | 10/2006 | Arvidsson | |
| 7,145,551 B1 * | 12/2006 | Bathiche et al. | 345/158 |
| 7,362,234 B1 | 4/2008 | Golliher et al. | |
| 7,793,890 B2 * | 9/2010 | Scherer | 244/190 |
| 7,817,134 B2 * | 10/2010 | Huang et al. | 345/158 |
| 2002/0008759 A1 * | 1/2002 | Hoyos | 348/211 |
| 2003/0144771 A1 | 7/2003 | Proulx | |
| 2005/0277470 A1 * | 12/2005 | Watanachote | 463/37 |
| 2006/0113428 A1 | 6/2006 | Choi | |
| 2006/0206244 A1 | 9/2006 | Arvidsson | |
| 2006/0224280 A1 | 10/2006 | Flanigan et al. | |
| 2008/0100574 A1 * | 5/2008 | Lou et al. | 345/163 |
| 2008/0122787 A1 * | 5/2008 | Huang et al. | 345/158 |
| 2008/0180272 A1 * | 7/2008 | Scherer | 340/825.72 |
| 2008/0220687 A1 * | 9/2008 | Taya | 446/37 |
| 2009/0146953 A1 * | 6/2009 | Lou et al. | 345/163 |
| 2009/0204276 A1 * | 8/2009 | Stuckman et al. | 701/2 |
| 2009/0295729 A1 * | 12/2009 | Kuo et al. | 345/166 |
| 2010/0218024 A1 * | 8/2010 | Yamamoto et al. | 713/324 |
| 2010/0245238 A1 * | 9/2010 | Kumagai et al. | 345/156 |
| 2010/0255915 A1 * | 10/2010 | Spradley | 463/38 |

* cited by examiner

Primary Examiner — Paul Ip
(74) Attorney, Agent, or Firm — Ingrassia Fisher & Lorenz, P.C.

(57) ABSTRACT

Systems and methods for inertially controlling a hovering unmanned aerial vehicle (HUAV) are provided. One inertial controller includes a frame and a sensor for detecting a change in an orientation and/or motion of the frame with respect to a predetermined neutral position. The inertial controller also includes a processor for generating commands to the HUAV to modify its current orientation and/or motion in accordance with the change. A system includes the above inertial controller and a sensor for determining a second change for an orientation and/or motion for the HUAV based on the change, and a processor for generating a signal commanding an HUAV control system to orient and/or move the HUAV in accordance with the second change. One method includes detecting a change in an orientation and/or motion of an inertial controller frame and commanding the HUAV to modify its current orientation and/or motion in accordance with the change.

19 Claims, 4 Drawing Sheets

SYSTEMS AND METHODS FOR INERTIALLY CONTROLLING A HOVERING UNMANNED AERIAL VEHICLES

FIELD OF THE INVENTION

The present invention generally relates to controllers, and more particularly relates to systems and methods for inertially controlling hovering unmanned aerial vehicles.

BACKGROUND OF THE INVENTION

Manual controls for current hovering unmanned aerial vehicles (HUAVs) are typically either a joystick or a stylus attached to a computing device in communication with an HUAV. Joystick controls are somewhat intuitive as the displacement of a joystick generally relates to the desired attitude change in the controlled vehicle. One drawback to current joystick controls for an HUAV is the fact that the control inputs are limited by the joystick platform. That is, joystick platforms typically enable controls to be input via one or more two dimensional controllers (e.g., a controller that receives inputs in the X direction and a second controller that receive inputs in the Y direction) and translates such inputs into three dimensional movement for the HUAV.

Stylus controls are less intuitive than joystick controls as their primary purpose is for pre-planned missions as opposed to interactive manual control. The stylus controls attempt to be intuitive by abstracting vehicle controls to move forward, backward, up, down, left, right, etc., but because of their nature result in slow, tedious manual control of the vehicle. Furthermore, stylus controls typically result in a "heads down" approach to controlling a particular vehicle, which limits the situational awareness of the user and exposes the user to physical threats.

Accordingly, it is desirable to provide systems and methods for controlling HUAVs using three-dimensional, free hand motion control inputs. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various embodiments provide inertial controllers for a hovering unmanned aerial vehicle (HUAV). One inertial controller comprises a frame and a sensor coupled to the frame and configured to detect a change in at least two degrees of freedom of motion in free space of the frame with respect to a predetermined neutral position of the frame. The controller further comprises a processor coupled to the sensor and configured to generate a first control signal representative of the change or current orientation, and a transmitter coupled to the processor and configured to transmit the first control signal to the HUAV, the first control signal commanding the HUAV to modify its current orientation, current motion, or both in accordance with the change in the orientation, the motion, or the orientation and the motion, respectively.

Systems for controlling an HUAV including a control system are also provided. One system comprises a controller comprising a frame, a first sensor coupled to the frame and configured to detect a change in a first orientation, a first motion, or both of the frame with respect to a predetermined neutral position of the frame, and a first processor coupled to the first sensor and configured to generate a first control signal representative of the change. The system also comprises a second sensor in communication with the first processor, the second sensor configured to receive the first control signal, determine a second change for a second orientation, a second motion, or both for the HUAV based on the first change, and generate a second signal representative of the second change, and a second processor configured to be coupled to the control system and coupled to the second sensor, the second processor further configured to receive the second signal and generate a third signal commanding the control system to orient, move, or orient and move the HUAV in accordance with the second change.

Another system comprises an HUAV and a controller in communication with one another. The HUAV comprises a control system for controlling movement of the HUAV, a signal receiver, a first processor coupled to the control system and the signal receiver, and transmit first control signals to the control system based on received control signals. The controller is configured to transmit second control signals to the signal receiver, and comprises a frame, an inertial measurement unit (IMU) coupled to the frame and configured to detect a change in six degrees of freedom of motion of the frame with respect to a predetermined neutral free space position and orientation of the frame, a second processor coupled to the IMU and configured to generate the second control signals, the second control signals representative of the change, and a signal transmitter coupled to the second processor and in communication with the signal transmitter. The signal transmitter is configured to transmit the second control signals to the signal receiver, the second control signals commanding the HUAV to modify its current orientation, current motion, or both in accordance with the change in the six degrees of freedom of motion of the frame.

Various embodiments also provide methods for controlling an HUAV. One method comprises the steps of detecting a change in a first orientation, a first motion, or both of a controller frame with respect to a predetermined neutral position of the controller frame, and commanding the HUAV to modify its current orientation, current motion, or both in accordance with the change in the first orientation, first motion, or both the first orientation and the first motion, respectively.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various embodiments of the invention provide apparatus and systems for controlling inertial hovering unmanned aerial vehicles (HUAVs) using three-dimensional (3D) control inputs. Other embodiments provide methods for controlling inertial hovering HUAVs using 3D control inputs.

Figure 1:
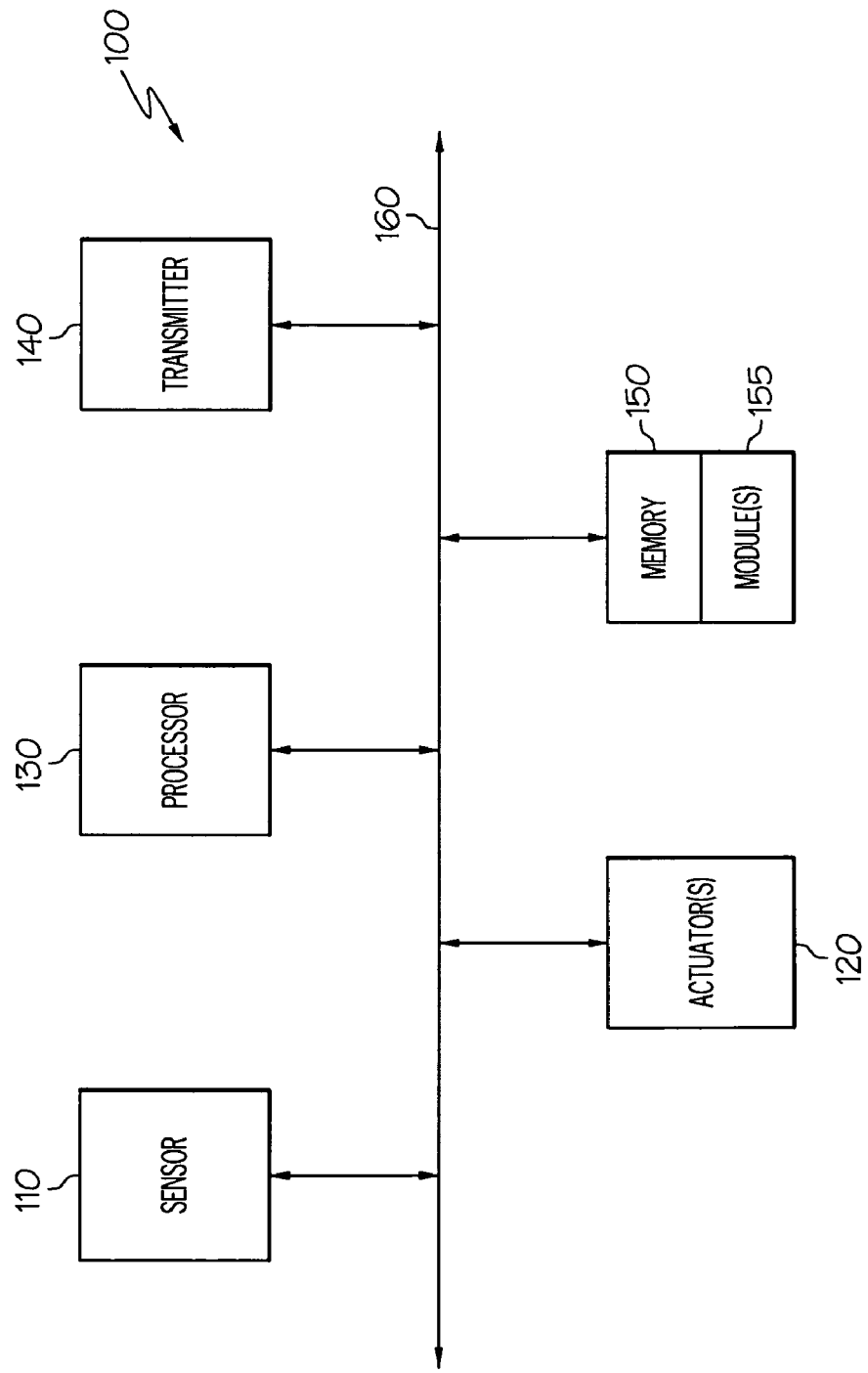
FIG. 1 is a block diagram of one embodiment of an inertial controller for a hovering unmanned aerial vehicle (HUAV)

Turning now to the figures, FIG. 1 is a block diagram of one embodiment of a inertial controller 100 for an HUAV. Inertial controller 100 comprises a sensor 110, one or more actuators 120, a processor 130, a transmitter 140, and memory 150 coupled to and in communication with one another via a bus 160 (e.g., a wired and/or wireless bus). Inertial controller 100 further comprises a frame 200 (see FIG. 2) that houses sensor 110, actuator(s) 120, processor 130, transmitter 140, memory 150, and bus 160.

Sensor 110 may be any device, system, hardware (and software), or combination thereof capable of sensing the relative orientation (e.g., attitude) and/or relative motion (e.g., direction and angular rotation) of frame 200 with respect to a predetermined object (e.g., the Earth). That is, sensor 110 may be any device, system, hardware (and software), or combination thereof capable of sensing at least two degrees of freedom of motion of frame 200. In one embodiment, sensor 110 is a three-axis inertial measurement unit (IMU) capable of sensing the six degrees of freedom of motion of frame 200. In another embodiment, sensor 110 comprises a three-axis accelerometer capable of sensing at least three degrees of freedom of motion of frame 200. In yet another embodiment, sensor 110 comprises a three-axis magnetometer capable of sensing the attitude of frame 200 relative to the magnetic filed of the Earth. In still another embodiment, sensor 110 comprises a two-axis accelerometer capable of sensing at least two degrees of freedom of motion of frame 200. As sensor 110 senses the orientation and/or motion of frame 200 with respect to the predetermined object, sensor 110 transmits signals representing such sensed orientation and/or motion to processor 130 (discussed below).

Each actuator 120 may be any type of actuator known in the art or developed in the future including, for example, a trigger, a button, a mouse, a lever, a switch, a joystick, a trackball, a knob, a dial, and the like actuators. Each actuator 120 is capable of receiving an input from a user according to the actuator type, generating a signal representing the user input, and transmitting the signal to processor 130 (discussed below).

In one embodiment, inertial controller 100 includes an actuator 120 for developing thrust commands. In another embodiment, inertial controller 100 includes an actuator 120 for generating a "follow" command (discussed below). Inertial controller 100, in yet another embodiment, includes an actuator 120 for generating a "hold" command (discussed below). In still another embodiment, inertial controller 100 includes an actuator 120 for generating a "shift" command (discussed below). In a further embodiment, inertial controller 100 includes an actuator 120 for generating an "angular offset" command (discussed below). In various embodiments, inertial controller 100 may include more than one actuator 120 such that inertial controller 100 is capable of generating more than one of the commands discussed above. As each actuator 120 generates a command, processor 130 interprets the command to the HUAV through transmitter 140.

Processor 130 may be any device, system, hardware (and software), or combinations thereof capable of receiving and processing the signals transmitted by sensor 110 and/or actuator(s) 120, and transmitting a control signal to an HUAV commanding the HUAV to move and/or perform a function consistent with the signal(s) received from sensor 110 and/or actuator(s) 120. In one embodiment, as processor 130 receives signals from sensor 110 representing a change in orientation and/or motion of frame 200 with respect to the predetermined object, processor 130 is configured to transmit control signals to the HUAV commanding the HUAV to mimic or copy the change in orientation and/or motion of frame 200. Specifically, as processor 130 receives a signal from sensor 110 indicating that frame 200 is being tilted to the right, left, up, or down, processor 130 transmits a signal to the HUAV commanding the HUAV to move right, left, toward, or away, respectively, with respect to the position of inertial controller 100.

Processor 130 transmits the signal to the HUAV via transmitter 140, which may be any device, system, hardware (or software) and combinations thereof capable of transmitting a control signal. In one embodiment, transmitter 140 may form a portion of a transceiver that is capable of transmitting and receiving signals from the HUAV.

Memory 150 may be any system, device, hardware (and software) or combinations thereof capable of storing electronic data or instructions for execution by processor 130. In one embodiment, memory 150 is configured to store one or more modules 155 for execution by processor 130.

Each module 155 is associated with a particular control function or command transmitted the HUAV. In one embodiment, module 155 is a navigation module configured to interpret the amount of right, left, up, or down in the signals generated by sensor 110 and/or the amount of thrust (to control altitude and/or speed) in the input signals received from a user via an actuator 120 (e.g., a "trigger" actuator). In another embodiment, module 155 is a "follow" module configured to activate inertial controller 100 when a signal is received from an associated actuator 120 such that the HUAV will follow the commands transmitted by inertial controller 100. Module 155, in yet another embodiment, is a "hold" module configured to command the HUAV to maintain (or hold) its current orientation and/or position when a signal is received from an associated actuator 120 until such hold command is withdrawn. In still another embodiment, module 155 is a "shift" module configured to command the HUAV to shift its current orientation by a predetermined amount (e.g., 5 degrees, 10 degrees, 20 degrees, 30 degrees, 45 degrees, 60 degrees, 90 degrees, etc.) and in a specified direction (e.g., right or left) when a signal is received from an associated actuator 120. Module 155, in a further embodiment, is an "angular offset" module configured to command the HUAV to modify the amount and/or direction of "tilt" in the HUAV when a signal is received from an associated actuator 120. That is, an HUAV does not generally fly with a horizontal gait, but rather, tilts in the direction in which it is flying, and as such, module 155 is control to control the amount and direction of such tilt.

Figure 2:
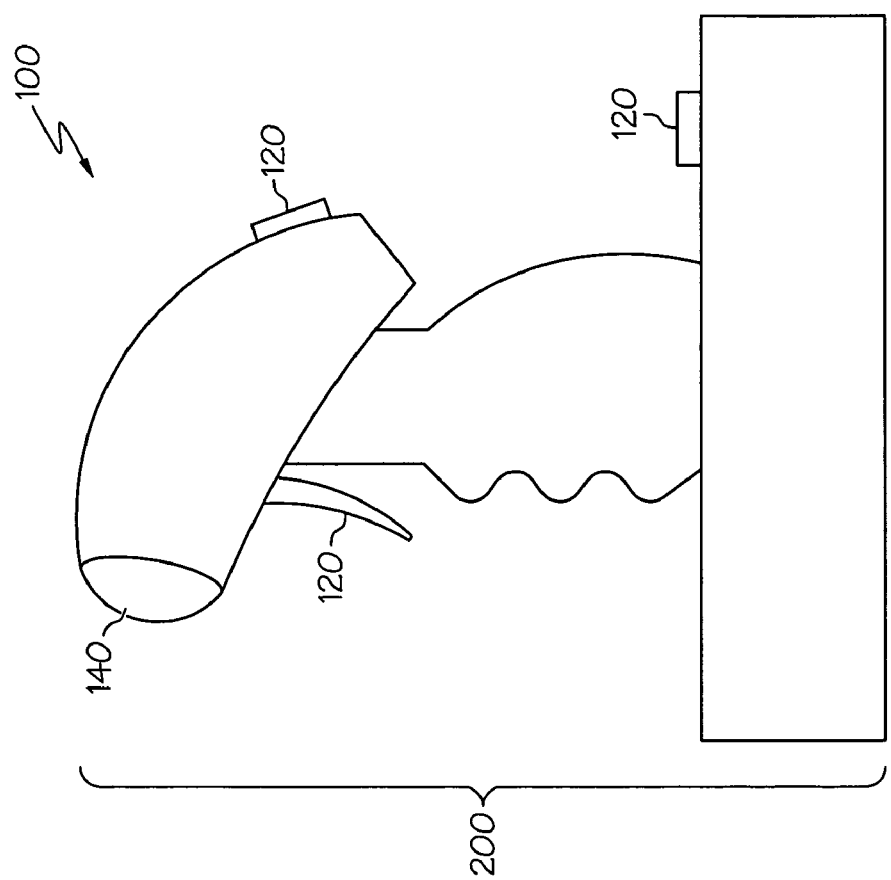
FIG. 2 is a diagram illustrating one embodiment of a frame for the inertial controller of FIG. 1.

Frame 200, at least in the embodiment illustrated in FIG. 2, comprises a pistol-grip shape. In other embodiments, frame 200 may include any other shape and/or configuration that enables inertial controller 100 to function in the manner discussed above and include one or more actuators 120.

Figure 3:
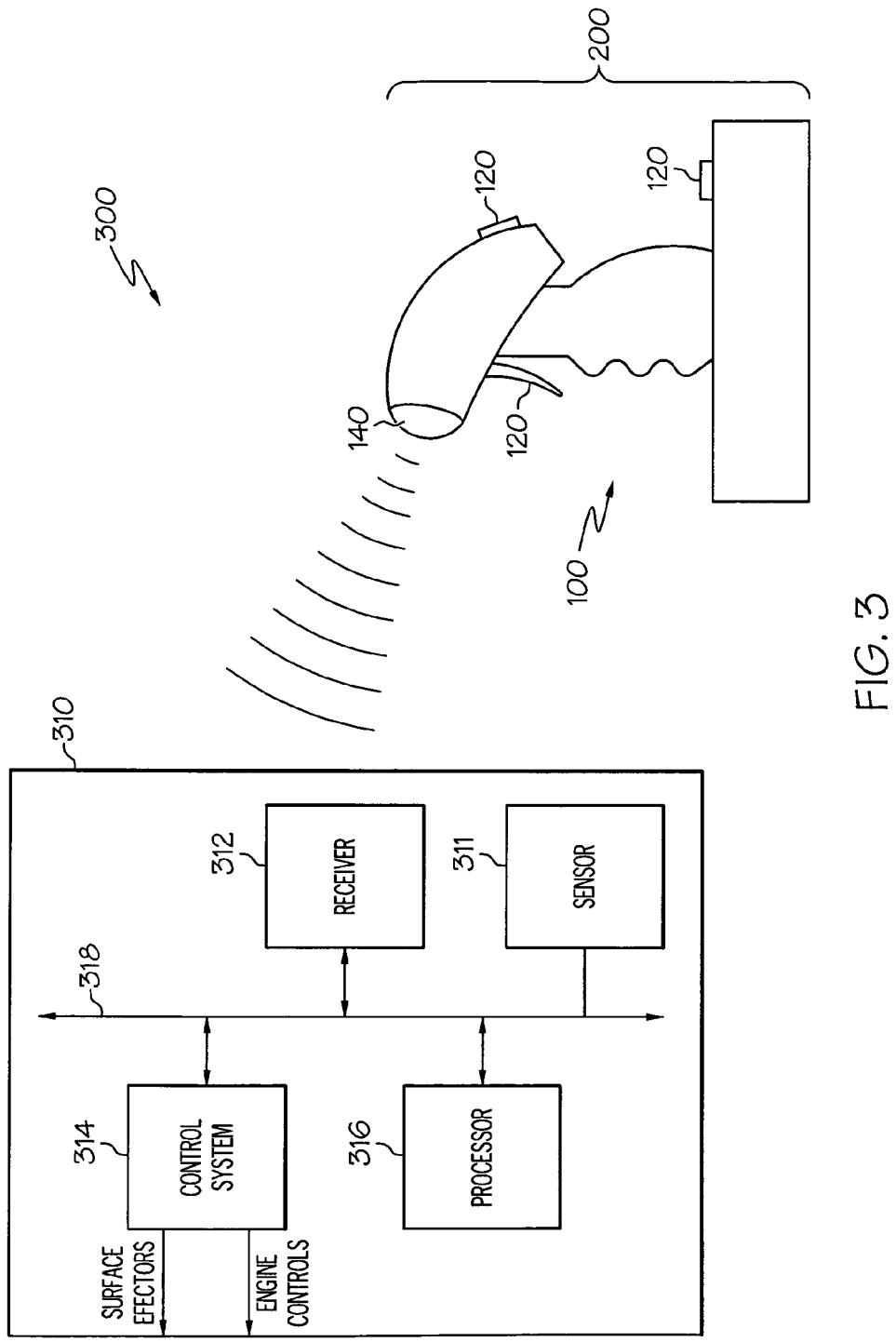
FIG. 3 is a block diagram illustrating one embodiment of an HUAV control system including the inertial controller of FIG. 1.

FIG. 3 is a block diagram illustrating one embodiment of a HUAV control system 300. At least in the illustrated embodiment, system 300 includes inertial controller 100 (see FIG. 1) comprising frame 200 (see FIG. 2) in communication with an HUAV 310.

HUAV 310 may be any HUAV known in the art or developed in the future. HUAV 310, at least in the embodiment illustrated in FIG. 3, comprises a sensor 311 (e.g., an IMU), a receiver 312, a control system 314 coupled to and in communication with a processor 316 via a bus 318 (e.g., wired and/or wireless).

Sensor 311 may be any device, system, hardware (and software), or combination thereof capable of sensing the relative orientation (e.g., attitude) and/or relative motion (e.g., direction and angular rotation) of HUAV 310 with respect to a predetermined object (e.g., the Earth). That is, sensor 311 may be any device, system, hardware (and software), or combination thereof capable of sensing at least two degrees of freedom of motion of HUAV 310. In one embodiment, sensor 311 is a three-axis inertial measurement unit (IMU) capable of sensing the six degrees of freedom of motion of HUAV 310. In another embodiment, sensor 311 comprises a three-axis accelerometer capable of sensing at least three degrees of freedom of motion of HUAV 310. In yet another embodiment, sensor 311 comprises a two-axis accelerometer capable of sensing at least two degrees of freedom of motion of HUAV 310. In still another embodiment, sensor 311 comprises a three-axis magnetometer capable of sensing attitude relative to the magnetic filed of the Earth.

Receiver 312 may be any device, system, hardware (or software) and combinations thereof capable of receiving a control signal from inertial controller 100 (e.g., transmitter 140 in FIG. 1) and transmitting the received control signal to processor 314. In one embodiment, receiver 312 may form a portion of a transceiver that is capable of receiving and transmitting signals to/from inertial controller 100.

Control system 314 may be any device and/or system capable of controlling the movement of HUAV 310. Control system 314 comprises a power plant (e.g., an engine, motor, etc.) and mechanisms for influencing/controlling the direction and orientation of HUAV 310 during flight, which may include, for example, the use of surface effectors and/or engine controls.

Processor 316 may be any device, system, hardware (and software), or combinations thereof capable of receiving and processing the signals transmitted by inertial controller 100, and transmitting a control signal to control system 314 commanding control system 314 to move or orient HUAV 310 and/or perform a function consistent with the signal(s) received from inertial controller 100. Specifically, as processor 316 receives signals from inertial controller 100 commanding HUAV 310 to move to the right, left, toward, or away from inertial controller 100, increase/decrease speed, and/or increase/decrease altitude, processor 316 transmits signals to control system 314 commanding control system 314 to perform such commands. Similarly, as processor 316 receives signals from inertial controller 100 commanding HUAV 310 to "follow," "hold," "shift," or perform an angular offset, processor 316 transmits a signal to control system 314 commanding control system 314 to perform such commands.

Figure 4:
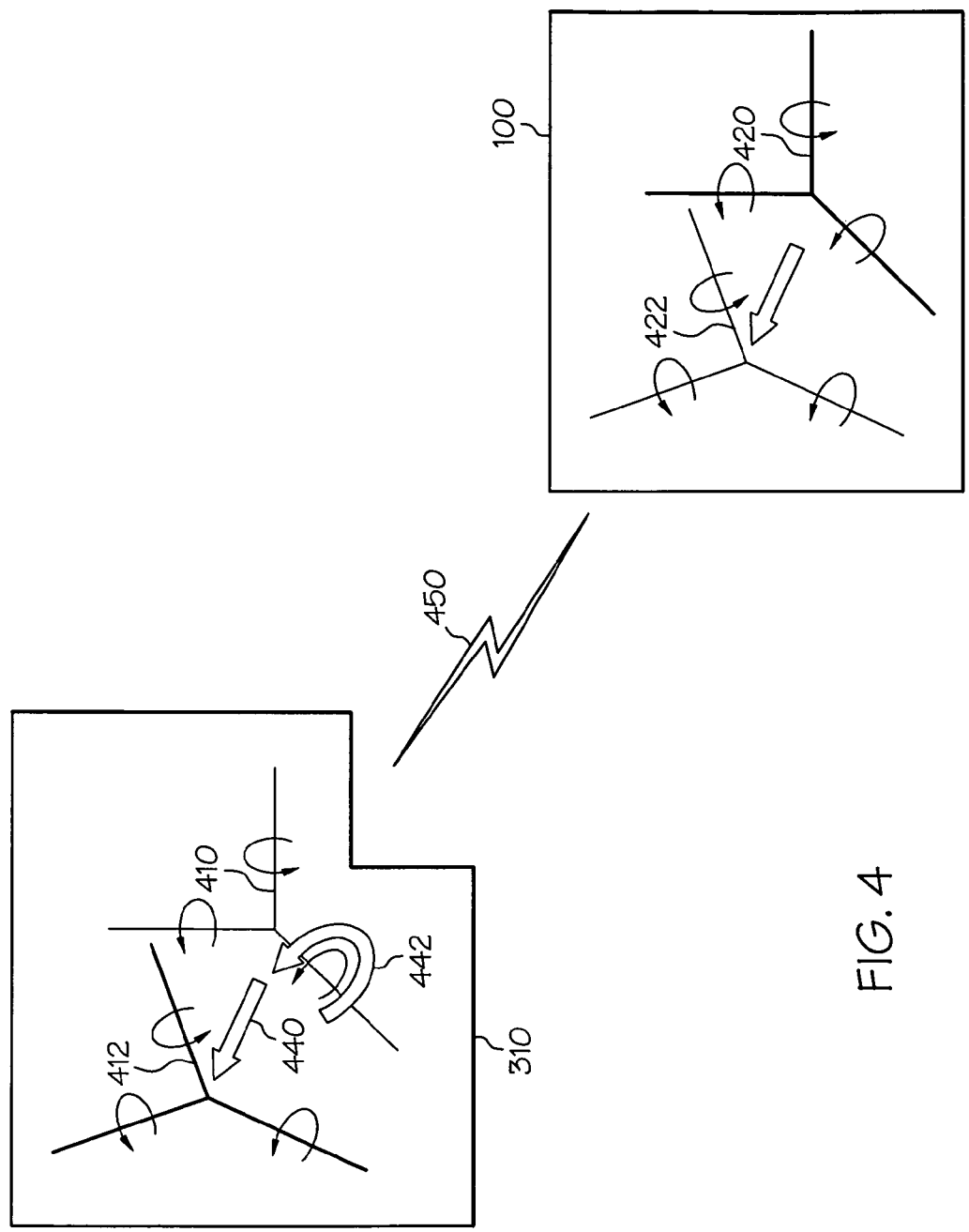
FIG. 4 is a diagram illustrating two sensed reference frames for the inertial controller of FIG. 1 and an HUAV in FIG. 3, and the control signal response of the HUAV to the computed error and subsequent closure of the error by a control system.

FIG. 4 is a diagram illustrating two sensed reference frames for inertial controller 100 and HUAV 310, and the control signal response of HUAV 310 to the computed error and subsequent closure of the error by a control system. In FIG. 4, reference axes 410 and 420 represent the current position and orientation of HUAV 310 and inertial controller 100, respectively. As inertial controller 100 rotates and/or translates to a new position and/or orientation represented by reference axes 422, transmitter 140 transmits a control signal 450 to receiver 312 indicating the new position and/or orientation. Processor 316, which knows the current position and orientation (represented by reference axes 410) of HUAV 310 via sensor 311, receives control signal 450 from receiver 312 and detects a difference between reference axes 410 and reference axes 422, which difference is identified as a translation error 440 and/or a rotational error 442. That is, processor 316 recognizes that the position and/or orientation of inertial controller 100 has changed to reference axes 422, and commands control system 314 to make the proper adjustment to the position and/or orientation of HUAV 310 so that the position and orientation of HUAV matches reference axes 422, which is represented by reference axes 412 (i.e., reference axes 412 equals reference axes 422). In other words, the position and/or orientation of HUAV 310 is changed until translation error 440 and rotational error 442 both equal zero.

Notably, while the various embodiments have been discussed above with respect to an HUAV, the invention is not limited to HUAVs. That is, the various embodiments discussed above may be applied to other aerospace vehicles including, for example, a helicopter, an airplane, a satellite, a rocket, a missile, a space shuttle, and the like aerospace vehicles. Furthermore, the various embodiments of inertial controller 100 and HUAV control system 300, which provide free space hand motion control of the various aerospace vehicles, enable the user to have "eyes-on" control of the aerospace vehicles.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. An inertial controller for a hovering unmanned aerial vehicle (HUAV), comprising:
   a frame;
   a sensor coupled to the frame and configured to detect at least two degrees of freedom of motion in free space of the frame with respect to a predetermined neutral free space position of the frame;
   a processor coupled to the sensor and configured to generate a first control signal representative of the change; and
   a transmitter coupled to the processor and configured to transmit the first control signal to the HUAV, the first control signal commanding the HUAV to modify its current orientation, current motion, or both in accordance with the change in the orientation, the motion, or the orientation and the motion, respectively.

2. The inertial controller of claim 1, wherein the sensor comprises a two-axis accelerometer.

3. The inertial controller of claim 1, wherein the sensor comprises a three-axis accelerometer configured to detect at least three degrees of freedom of motion.

4. The inertial controller of claim 1, wherein the sensor comprises a three axis inertial measurement unit (IMU) configured to provide six degrees of freedom of motion.

5. The inertial controller of claim 1, further comprising an actuator coupled to the processor and configured to receive a thrust input from a user, wherein the processor is further configured to command the HUAV to modify an amount of thrust in accordance with the thrust input in response thereto.

6. The inertial controller of claim 1, further comprising an actuator coupled to the processor and configured to receive a hold input from a user, wherein the processor is further configured to command the HUAV to hold its current orientation in response thereto.

7. The inertial controller of claim 1, further comprising an actuator coupled to the processor and configured to receive a shift input from a user, wherein the processor is further configured to command the HUAV to shift its current orientation by a predetermined amount in a predetermined direction in response thereto.

8. A system for controlling an inertial hovering unmanned aerial vehicle (HUAV) including a control system, comprising:
   an inertial controller comprising:
      a frame,
      a first sensor coupled to the frame and configured to detect a first change in a first orientation, a first motion, or both of the frame with respect to a predetermined neutral position of the frame, and
      a first processor coupled to the first sensor and configured to generate a first control signal representative of the first change;
   a second sensor in communication with the first processor, the second sensor configured to receive the first control signal, determine a second change for a second orientation, a second motion, or both for the HUAV based on the first change, and generate a second signal representative of the second change; and
   a second processor configured to be coupled to the control system and coupled to the second sensor, the second processor further configured to receive the second signal and generate a third signal commanding the control system to orient, move, or orient and move the HUAV in accordance with the second change.

9. The system of claim 8, wherein the first and second sensors each comprise a two axis accelerometer configured to provide two degrees of freedom of motion.

10. The system of claim 8, wherein the first and second sensors each comprise a three axis accelerometer configured to provide three degrees of freedom of motion.

11. The system of claim 8, wherein the first and second sensors each comprise a three axis inertial measurement unit (IMU) configured to provide six degrees of freedom of motion.

12. The system of claim 8, wherein the inertial controller further comprises an actuator coupled to the first processor and configured to receive a thrust input from a user, the first processor being further configured to generate a fourth signal representative of the thrust input, and
   wherein the second processor is configured to receive the fourth signal and generate a fifth signal commanding the control system to modify an amount of thrust for the HUAV in accordance with the thrust input.

13. The system of claim 8, wherein the inertial controller further comprises an actuator coupled to the first processor and configured to receive a hold input from a user, the first processor being further configured to generate a fourth signal representative of the hold input, and
   wherein the second processor is configured to receive the fourth signal and generate a fifth signal commanding the control system to hold a current orientation of the HUAV.

14. The system of claim 8, wherein the inertial controller further comprises an actuator coupled to the first processor and configured to receive a shift input from a user, the first processor being further configured to generate a fourth signal representative of the shift input, and
   wherein the second processor is configured to receive the fourth signal and generate a fifth signal commanding the control system to shift a current orientation of the HUAV by a predetermined amount in a predetermined direction.

15. A method for inertially controlling a hovering unmanned aerial vehicle (HUAV), comprising the steps of:
   detecting a change in a first orientation, a first motion, or both of a controller frame with respect to a predetermined neutral free space position of the controller frame; and
   commanding the HUAV to modify its current orientation, current motion, or both in accordance with the change in the first orientation, first motion, or both the first orientation and the first motion, respectively.

16. The method of claim 15, further comprising the steps of:
   receiving a thrust input from a user; and
   commanding the HUAV to modify an amount of thrust in accordance with the thrust input.

17. The method of claim 15, further comprising the steps of:
   receiving a hold input from a user; and
   commanding the HUAV to hold its current orientation.

18. The method of claim 15, further comprising the steps of:
   receiving a shift input from a user; and
   commanding the HUAV to shift its current orientation by a predetermined amount in a predetermined direction.

19. A system, comprising:
   A hovering unmanned aerial vehicle (HUAV), comprising:
      a control system for controlling movement of the HUAV,
      a signal receiver, and
      a first processor coupled to the control system and the signal receiver, and transmit first control signals to the control system based on received control signals; and
   an inertial controller configured to transmit second control signals to the signal receiver, the controller comprising:
      a frame,
      an inertial measurement unit (IMU) coupled to the frame and configured to detect a change in six degrees of freedom of motion of the frame with respect to a predetermined neutral position of the frame,
      a second processor coupled to the IMU and configured to generate the second control signals, the second control signals representative of the change, and
      a signal transmitter coupled to the second processor and in communication with the signal transmitter, the signal transmitter configured to transmit the second control signals to the signal receiver, the second control signals commanding the HUAV to modify its current orientation, current motion, or both in accordance with the change in the six degrees of freedom of motion in free space of the frame.

* * * * *